United States Patent
Kumar et al.

(10) Patent No.: US 8,934,377 B2
(45) Date of Patent: Jan. 13, 2015

(54) RECONFIGURABLE NOC FOR CUSTOMIZING TRAFFIC AND OPTIMIZING PERFORMANCE AFTER NOC SYNTHESIS

(71) Applicant: NetSpeed Systems, San Jose, CA (US)

(72) Inventors: Sailesh Kumar, San Jose, CA (US); Eric Norige, East Lansing, MI (US)

(73) Assignee: NetSpeed Systems, San Jose, CA (US)

(*) Notice: Subject to any disclaimer, the term of this patent is extended or adjusted under 35 U.S.C. 154(b) by 124 days.

(21) Appl. No.: 13/794,273

(22) Filed: Mar. 11, 2013

(65) Prior Publication Data
US 2014/0254388 A1    Sep. 11, 2014

(51) Int. Cl.
*H04L 12/28* (2006.01)
*H04L 12/851* (2013.01)

(52) U.S. Cl.
CPC .................. *H04L 47/2425* (2013.01)
USPC ........................... 370/254; 370/465

(58) Field of Classification Search
None
See application file for complete search history.

(56) References Cited

U.S. PATENT DOCUMENTS

| | | | |
|---|---|---|---|
| 5,432,785 A | 7/1995 | Ahmed et al. |
| 5,764,740 A | 6/1998 | Holender |
| 5,991,308 A | 11/1999 | Fuhrmann et al. |
| 6,003,029 A | 12/1999 | Agrawal et al. |
| 6,249,902 B1 | 6/2001 | Igusa et al. |
| 6,415,282 B1 | 7/2002 | Mukherjea et al. |
| 6,925,627 B1 | 8/2005 | Longway et al. |
| 7,065,730 B2 | 6/2006 | Alpert et al. |
| 7,318,214 B1 | 1/2008 | Prasad et al. |
| 7,590,959 B2 | 9/2009 | Tanaka |
| 7,725,859 B1 | 5/2010 | Lenahan et al. |
| 7,808,968 B1 | 10/2010 | Kalmanek, Jr. et al. |
| 7,917,885 B2 | 3/2011 | Becker |
| 8,050,256 B1 | 11/2011 | Bao et al. |
| 8,059,551 B2 | 11/2011 | Milliken |
| 8,099,757 B2 | 1/2012 | Riedle et al. |

(Continued)

FOREIGN PATENT DOCUMENTS

| | | |
|---|---|---|
| CN | 103684961 A | 3/2014 |
| WO | 2014059024 A1 | 4/2014 |

OTHER PUBLICATIONS

International Search Report and Written Opinion for PCT/US2014/023625, Jul. 10, 2014, 9 pgs.

(Continued)

*Primary Examiner* — Kevin C Harper
(74) *Attorney, Agent, or Firm* — Procopio, Cory, Hargreaves & Savitch LLP

(57) ABSTRACT

Systems and methods described herein are directed to solutions for Network on Chip (NoC) interconnects that supports reconfigurability to support a variety of different traffic profiles each having different sets of traffic flows after the NoC is designed and deployed in a SoC. Reconfiguration of the NoC to map and load a new traffic profile or change the currently mapped traffic profile is performed by an external optimization module which maps various transactions of a given traffic profile to the NoC and reconfigure the NoC hardware by loading the computed mapping information. As part of the mapping process, load balancing between NoC layers may be performed by automatically assigning the transactions in the traffic profile to be routed over certain NoC layers and channels, automatically determining the routes based on the bandwidth requirements of the transaction. The deadlock avoidance and isolation properties of various transactions are maintained during the mapping.

20 Claims, 16 Drawing Sheets

(56) References Cited

U.S. PATENT DOCUMENTS

| | | |
|---|---|---|
| 8,136,071 B2 | 3/2012 | Solomon |
| 8,281,297 B2 | 10/2012 | Dasu et al. |
| 8,312,402 B1 | 11/2012 | Okhmatovski et al. |
| 8,448,102 B2 | 5/2013 | Kornachuk et al. |
| 8,492,886 B2 | 7/2013 | Or-Bach et al. |
| 8,541,819 B1 | 9/2013 | Or-Bach et al. |
| 8,543,964 B2 | 9/2013 | Ge et al. |
| 8,601,423 B1 | 12/2013 | Philip et al. |
| 8,635,577 B2 | 1/2014 | Kazda et al. |
| 8,667,439 B1 | 3/2014 | Kumar et al. |
| 8,717,875 B2 | 5/2014 | Bejerano et al. |
| 2002/0071392 A1 | 6/2002 | Grover et al. |
| 2002/0073380 A1 | 6/2002 | Cooke et al. |
| 2002/0095430 A1 | 7/2002 | Egilsson et al. |
| 2004/0216072 A1 | 10/2004 | Alpert et al. |
| 2005/0147081 A1 | 7/2005 | Acharya et al. |
| 2006/0161875 A1 | 7/2006 | Rhee |
| 2006/0268909 A1 | 11/2006 | Langevin et al. |
| 2007/0088537 A1 | 4/2007 | Lertora et al. |
| 2007/0118320 A1 | 5/2007 | Luo et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2008/0072182 A1 | 3/2008 | He et al. |
| 2008/0120129 A1 | 5/2008 | Seubert et al. |
| 2009/0070726 A1 | 3/2009 | Mehrotra et al. |
| 2009/0106569 A1* | 4/2009 | Roh et al. ................ 713/300 |
| 2009/0268677 A1 | 10/2009 | Chou et al. |
| 2009/0313592 A1 | 12/2009 | Murali et al. |
| 2010/0040162 A1 | 2/2010 | Suehiro |
| 2011/0022754 A1 | 1/2011 | Cidon et al. |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0154282 A1 | 6/2011 | Chang et al. |
| 2011/0276937 A1 | 11/2011 | Waller |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0099475 A1 | 4/2012 | Tokuoka |
| 2012/0110541 A1 | 5/2012 | Ge et al. |
| 2012/0155250 A1 | 6/2012 | Carney et al. |
| 2012/0207012 A1* | 8/2012 | Kompella ................ 370/216 |
| 2013/0028090 A1 | 1/2013 | Yamaguchi et al. |
| 2013/0051397 A1 | 2/2013 | Guo et al. |
| 2013/0080073 A1 | 3/2013 | de Corral |
| 2013/0103369 A1 | 4/2013 | Huynh et al. |
| 2013/0151215 A1 | 6/2013 | Mustapha |
| 2013/0159944 A1 | 6/2013 | Uno et al. |
| 2013/0174113 A1 | 7/2013 | Lecler et al. |
| 2013/0207801 A1 | 8/2013 | Barnes |
| 2013/0219148 A1 | 8/2013 | Chen et al. |
| 2013/0263068 A1 | 10/2013 | Cho et al. |
| 2013/0326458 A1 | 12/2013 | Kazda et al. |
| 2014/0068132 A1 | 3/2014 | Philip et al. |
| 2014/0092740 A1 | 4/2014 | Wang et al. |
| 2014/0098683 A1 | 4/2014 | Kumar et al. |
| 2014/0115218 A1 | 4/2014 | Philip et al. |
| 2014/0115298 A1 | 4/2014 | Philip et al. |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

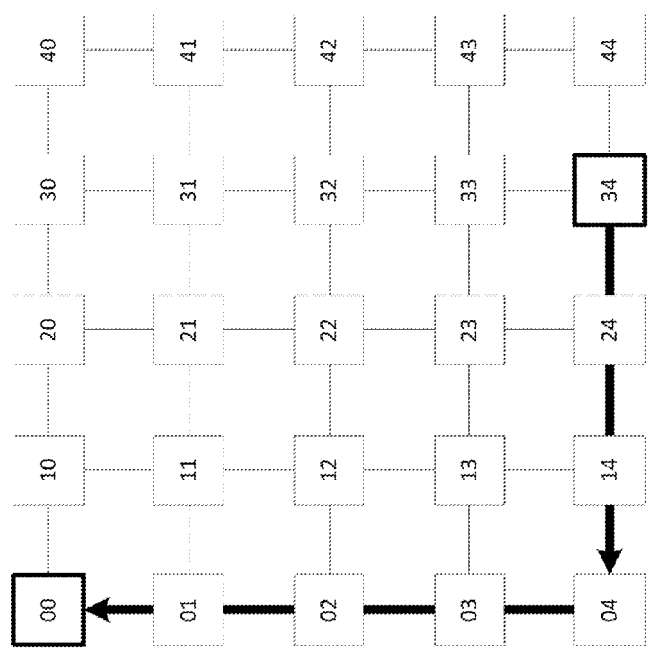

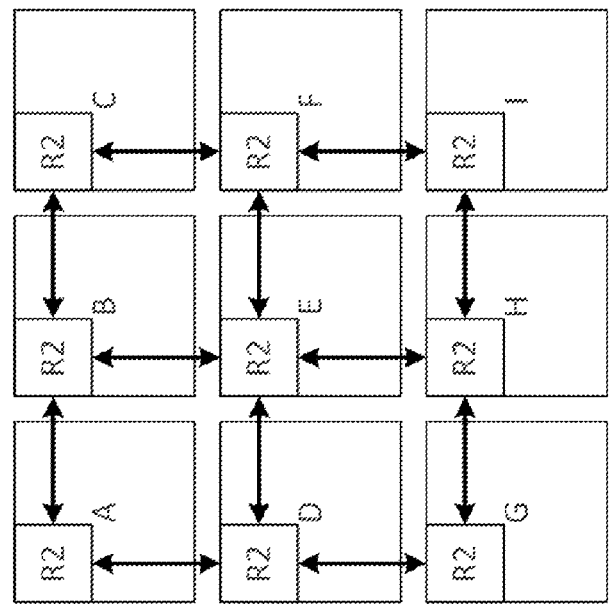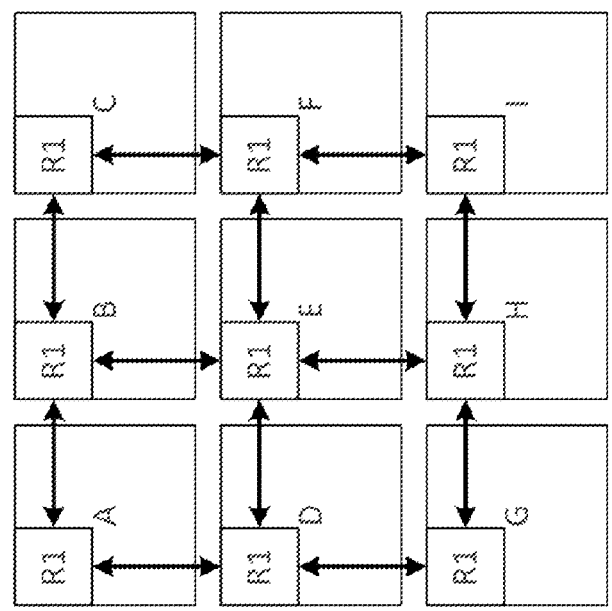
FIG. 3(a)

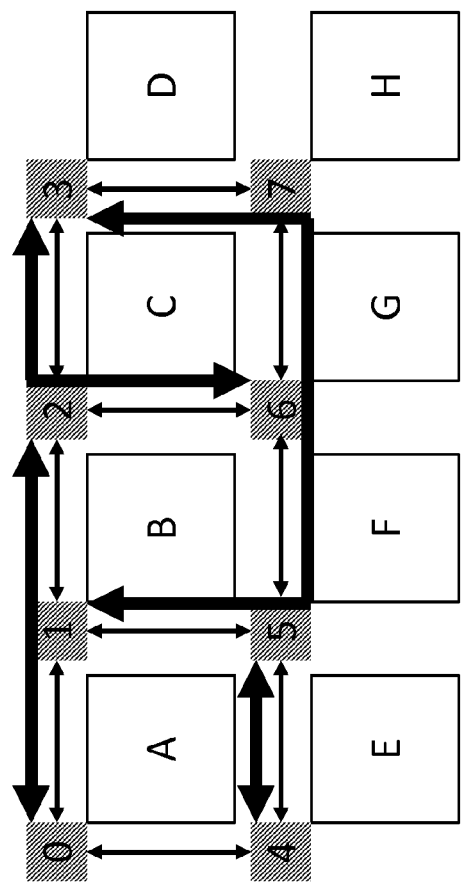
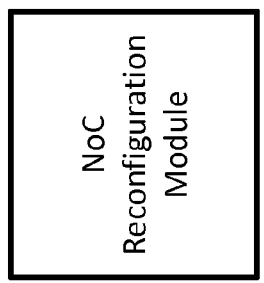
FIG. 6

Types of routing table:

800 ⟶ {src node, dest node, route info}
801 ⟶ {src node, dest node, noc id, route info}
802 ⟶ {src node, dest node, noc id, vc id, route info}
803 ⟶ {src node, dest node, noc id, vc id, transaction id, route info}

Router optimization config:

804 ⟶ {noc id, node id, active}
805 ⟶ {noc id, node id, port id, active}
806 ⟶ {noc id, node id, src port id, dest port id, active}
807 ⟶ {noc id, node id, src port/vc id, dest port/vc id, active}

VC priority and QoS config:

808 ⟶ {noc id, node id, port id, vc id, pri}
809 ⟶ {noc id, node id, port id, vc id, weight}
810 ⟶ {noc id, node id, port id, vc id, barrier period}
811 ⟶ {noc id, node id, port id, vc id, max/avg transmission rates}

FIG. 8

RECONFIGURABLE NOC FOR CUSTOMIZING TRAFFIC AND OPTIMIZING PERFORMANCE AFTER NOC SYNTHESIS

BACKGROUND

1. Technical Field

Methods and example implementations described herein are directed to interconnect architecture, and more specifically, to reconfiguring Network on Chip (NoC) to customize traffic and optimize performance after NoC is designed and deployed.

2. Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Taurus (as shown in FIG. 1(c)) are examples of topologies in the related art. Mesh and Taurus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels.

A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times.

FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303, or bridge, may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication which thereby reduces the global average latency, as well as reduce the number of router nodes and links over which the higher bandwidth of this communication must be provisioned.

Moving two hosts closer together may make certain other hosts far apart since all hosts must fit into the 2D planar NoC topology without overlapping with each other. Thus, various tradeoffs must be made and the hosts must be placed after examining the pair-wise bandwidth and latency requirements between all hosts so that certain global cost and performance metrics is optimized. The cost and performance metrics can be, for example, average structural latency between all communicating hosts in number of router hops, or sum of bandwidth between all pair of hosts and the distance between them in number of hops, or some combination of these two. This optimization problem is known to be NP-hard and heuristic based approaches are often used. The hosts in a system may vary in shape and sizes with respect to each other, which puts additional complexity in placing them in a 2D planar NoC topology, packing them optimally while leaving little whitespaces, and avoiding overlapping hosts.

The optimization approaches introduced so far to determine the channel capacity, routes, host positions, etc., are useful when the exact traffic profile is known in advance at the NoC design time. If the precise traffic profile is not known at the design time, and the traffic profile changes during the NoC operation based on the SoC application's requirements, then the NoC design must allow these adjustments. For the NoC to allow these changes, the NoC must be designed so that it has knowledge of the changes that may occur in the traffic profile in a given system and ensure that any combination of allowable traffic profiles are supported by the NoC hardware architecture.

SUMMARY

Aspects of the present application include a method, which may involve designing a NoC that can support a variety of different traffic profiles each consisting of different sets of traffic flows; reconfiguring the NoC to allow loading of a new traffic profile or making changes in the existing traffic profile after the NoC is designed and deployed in a SoC; an external optimization module that can compute how to map a given traffic profile to the NoC and reconfigure the NoC hardware by loading the computed mapping information; as part of the mapping process, performing load balancing between NoC layers by automatically assigning the transactions in the traffic profile to NoC layers, automatically determining the routes in the corresponding NoC layers and balancing load on various NoC channels based on the bandwidth requirements of the transactions, and in the process also utilizing the available NoC layers and virtual channels for deadlock avoidance and isolation properties of various transactions of the traffic profile.

Aspects of the present application include a computer readable storage medium storing instructions for executing a process. The process may involve designing a NoC that can support a variety of different traffic profiles each consisting of different sets of traffic flows; reconfiguring the NoC to allow loading of a new traffic profile or making changes in the existing traffic profile after the NoC is designed and deployed in a SoC; an external optimization module that can compute how to map a given traffic profile to the NoC and reconfigure the NoC hardware by loading the computed mapping information; as part of the mapping process, performing load balancing between NoC layers by automatically assigning the transactions in the traffic profile to NoC layers, automatically determining the routes in the corresponding NoC layers and balancing load on various NoC channels based on the bandwidth requirements of the transactions, and in the process also utilizing the available NoC layers and virtual channels for deadlock avoidance and isolation properties of various transactions of the traffic profile.

Aspects of the present application include a system, which may involve designing a NoC that can support a variety of different traffic profiles each consisting of different sets of traffic flows; reconfiguring the NoC to allow loading of a new traffic profile or making changes in the existing traffic profile after the NoC is designed and deployed in a SoC; an external optimization module that can compute how to map a given traffic profile to the NoC and reconfigure the NoC hardware by loading the computed mapping information; as part of the mapping process, performing load balancing between NoC layers by automatically assigning the transactions in the traffic profile to NoC layers, automatically determining the routes in the corresponding NoC layers and balancing load on various NoC channels based on the bandwidth requirements of the transactions, and in the process also utilizing the available NoC layers and virtual channels for deadlock avoidance and isolation properties of various transactions of the traffic profile.

Aspects of the present application include an integrated circuit (IC), which may involve a Network on Chip (NoC) comprising a plurality of hosts interconnected with a plurality of channels by a plurality of routers; and a NoC reconfigurer module configured to change an active traffic profile of the NoC from a first subset of a plurality of system traffic profiles to a second subset of the plurality of system traffic profiles. The plurality of system traffic profiles may include allow all of the allowed traffic profiles of the System on Chip (SoC) incorporating the NoC.

BRIEF DESCRIPTION OF THE DRAWINGS

FIG. 2(a) illustrates an example of XY routing in a related art two dimensional mesh.

FIG. 3(a) illustrates an example of a related art two layer NoC interconnect.

FIG. 6 illustrates an example implementation of an external reconfiguration module to reconfigure the NoC hardware with new routing, QoS and activity information.

FIG. 8 illustrates the data-structures that may be used by the external optimization module to maintain the NoC reconfiguration information.

DETAILED DESCRIPTION

Figure 1A:
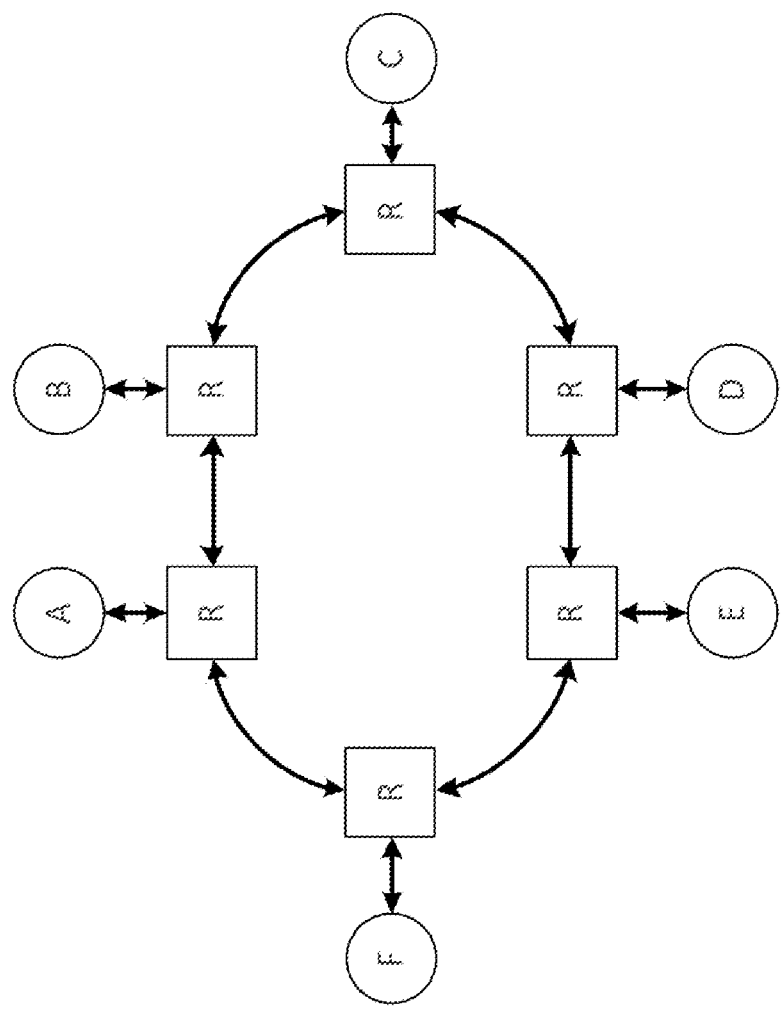
FIGS. 1(a), 1(b) 1(c) and 1(d) illustrate examples of Bidirectional ring, 2D Mesh, 2D Taurus, and 3D Mesh NoC Topologies.
Figure 1B:
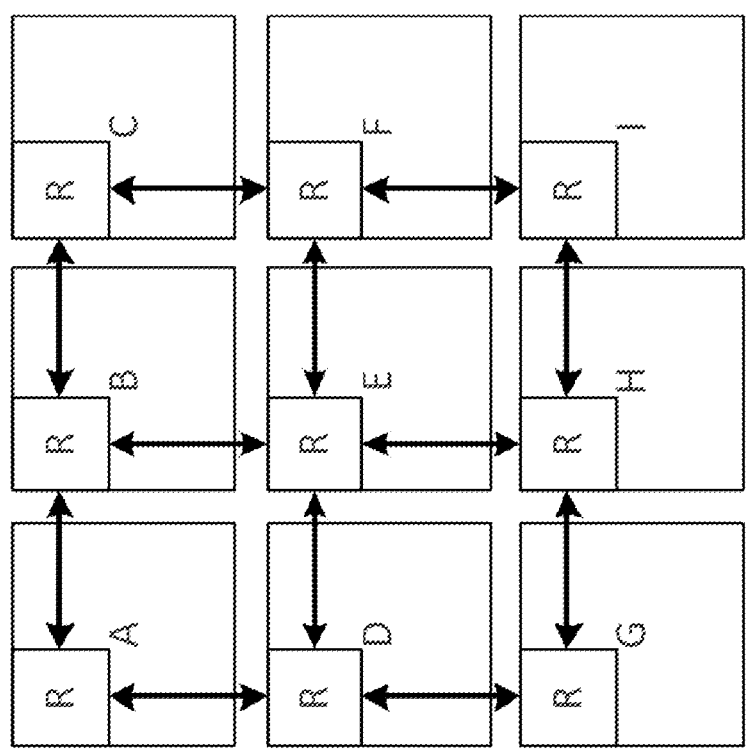
Figure 1C:
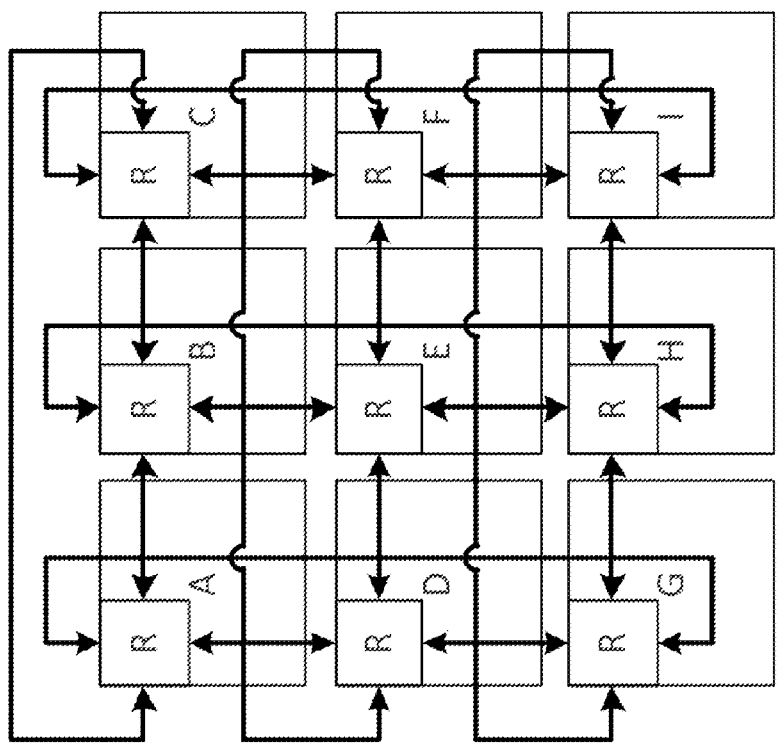
Figure 1D:
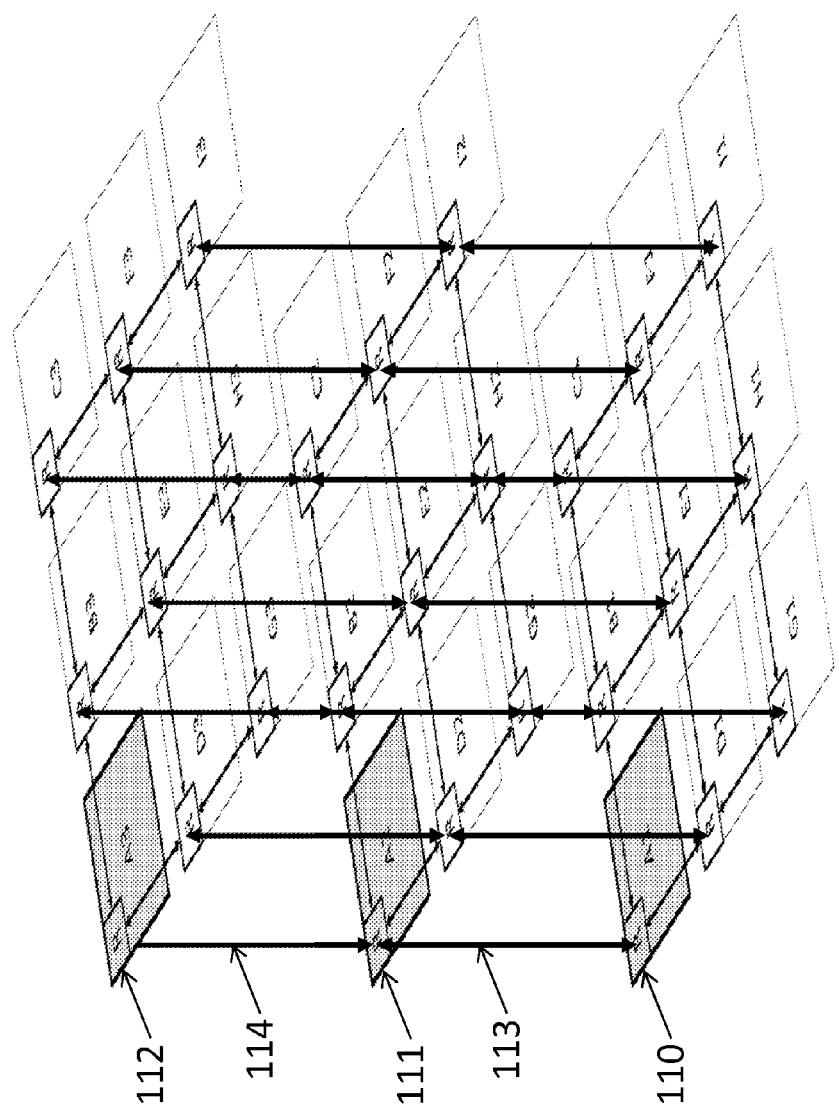
Figure 2B:
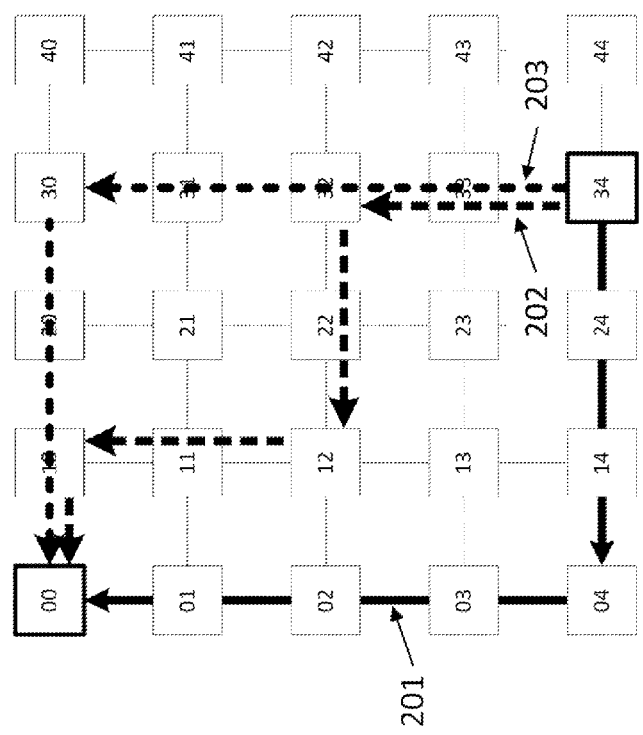
FIG. 2(b) illustrates three different routes between a source and destination nodes.
Figure 3B:
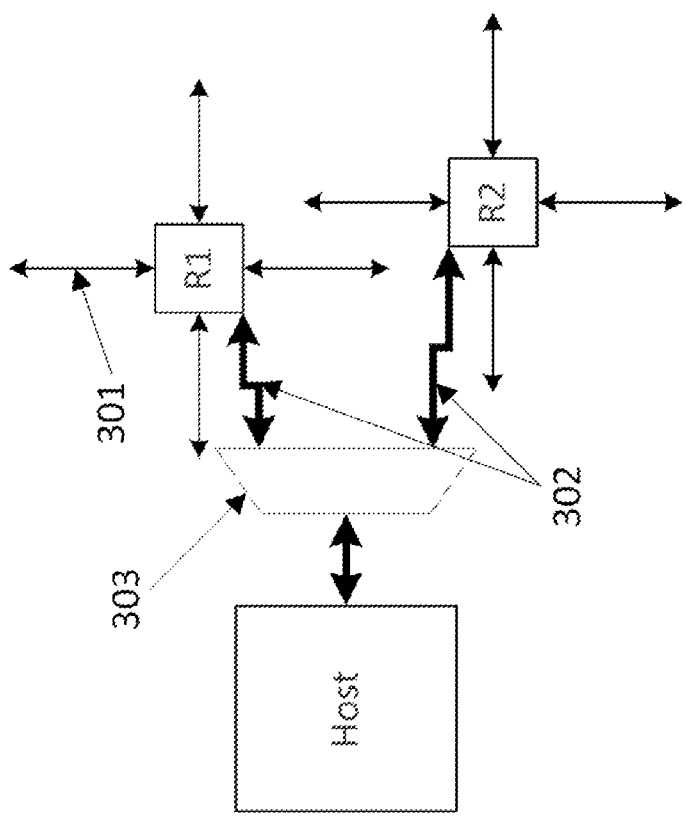
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

A distributed NoC interconnect connects various components in a system on chip with each other using multiple routers and point to point links between the routers. The traffic profile of a SoC includes the transactions between various components in the SoC and their properties (e.g., Quality of Service (QoS), priority, bandwidth and latency requirements, transaction sizes, etc.). The traffic profile information may be used to determine how various transactions will be routed in the NoC topology, and accordingly provision the link capacities, virtual channels and router nodes of the NoC. Accurate knowledge of the traffic profile can lead to an optimized NoC hardware with minimal overprovisioning in terms of link wires, virtual channel buffers and additional router nodes. A variety of SoCs today are designed to run a number of different applications; the resulting NoC traffic profile therefore may differ based on how and in what market segments the SoC is deployed, and what applications are supported. Supporting a variety of traffic profiles offers several challenges in the NoC design and optimization. Even if multiple traffic profiles are supported functionally, the traffic profile observed in a particular setting may be different from the set of profiles for which the NoC is optimized, leading to sub-optimal power consumption and NoC performance. Example implementations presented here are directed to design of a NoC that supports multiple traffic profiles, and allows reconfigurability to optimize the NoC performance for any given traffic profile after NoC is designed with the aid of an external optimization module. The external optimization module maps the transactions of any given traffic profile to the NoC hardware for optimized performance and power consumption, and generates the reconfiguration information in a format that can be loaded into the NoC hardware.

Example implementations described herein are directed to solutions for 2-D, 2.5-D and 3-D NoC interconnects. The example implementations may involve various aspects, such as: 1) designing NoC to support multiple sets of traffic profiles by mapping their transactions to NoC and allocating routes, virtual channels, and layers; 2) supporting hardware reconfigurability in the NoC to be able to optimize the NoC performance for a given subset of traffic profiles present in a SoC; 3) using an external optimization module to optimize the mapping of the subset of traffic profiles to the NoC hardware; 4) re-mapping the transactions of a given traffic profile to available NoC routes, virtual channels, and layers for improved system performance; 5) based on the new mapping, generating the reconfiguration information to be loaded into the NoC hardware; and 6) finally transmitting the reconfiguration information to the NoC in a format that can be loaded into NoC reconfiguration hardware.

Another example implementation may not fully support all traffic profile in the first aspect simultaneously. From among all of the traffic profiles, only certain subsets of traffic profiles may exist in the SoC simultaneously and therefore need to be fully supported in the NoC. NoC hardware can be designed accordingly supporting only the valid subsets of co-existing traffic profiles. An example implementation may also support all traffic profiles from the virtual channel allocation perspective, i.e. a virtual channel is assigned for every transaction in all of the traffic profiles, but not in terms of bandwidth. Thus, all of the traffic profiles may be mappable to the available NoC layers and virtual channels of the NoC hardware; but the bandwidth requirements of certain transactions of traffic profiles may not be fully satisfied.

In the first aspect, an example implementation may determine the virtual channels and NoC layers for the transactions of the subset of traffic profiles that may co-exist only, and not re-compute routes for them, if the routes for the transactions have already been computed when the previous subsets of the traffic profiles were mapped. Alternatively, only the virtual channels may be determined and assigned again, leaving the routes and NoC layer mapping of the transactions unchanged, if they have already been computed.

Figure 4A:
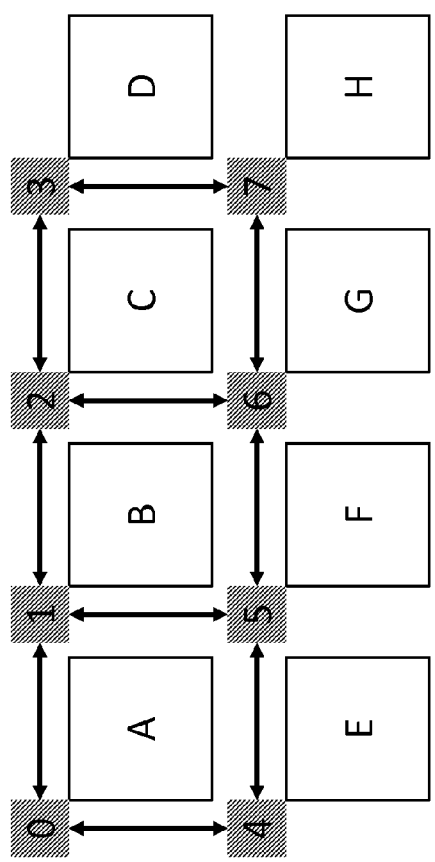
FIG. 4(a) illustrates a 4×2 mesh NoC mapping three traffic profiles using XY routing.

One example implementation for mapping multiple traffic profiles to the NoC interconnect and mapping the transactions is described in FIG. 4(a). Here there are three traffic profiles that need to be supported in a NoC interconnect connecting eight hosts, A, B, C, D, E, F, G, H. The inter-component communications of the three traffic profiles are as follows:
Traffic Profile 1: A<->B; A<->G;
Traffic Profile 2: A<->C; B<->D; D<->G; E<->F;
Traffic Profile 3: G<->C;

The NoC is a 4×2 mesh topology as shown in FIG. 4(a). To support the three traffic profiles, routes and virtual channels are allocated for each transaction of all of the traffic profiles. In this case, a single NoC layer is allocated (for additional bandwidth and channels, more NoC layers may be allocated). A number of schemes can be used for allocation of NoC channels and routes and multiple layers, some of which are described in U.S. application Ser. Nos. 13/599,559, 13/745, 684, and 13/752,226, hereby incorporated by reference for all purposes in their entirety. In this example, XY routes are used for all transactions, and the links and router nodes along the routes of all transactions in the three traffic profiles are allocated as shown in FIG. 4(a). Virtual channels allocated at various links between routers are omitted for clarity.

Figure 4B:
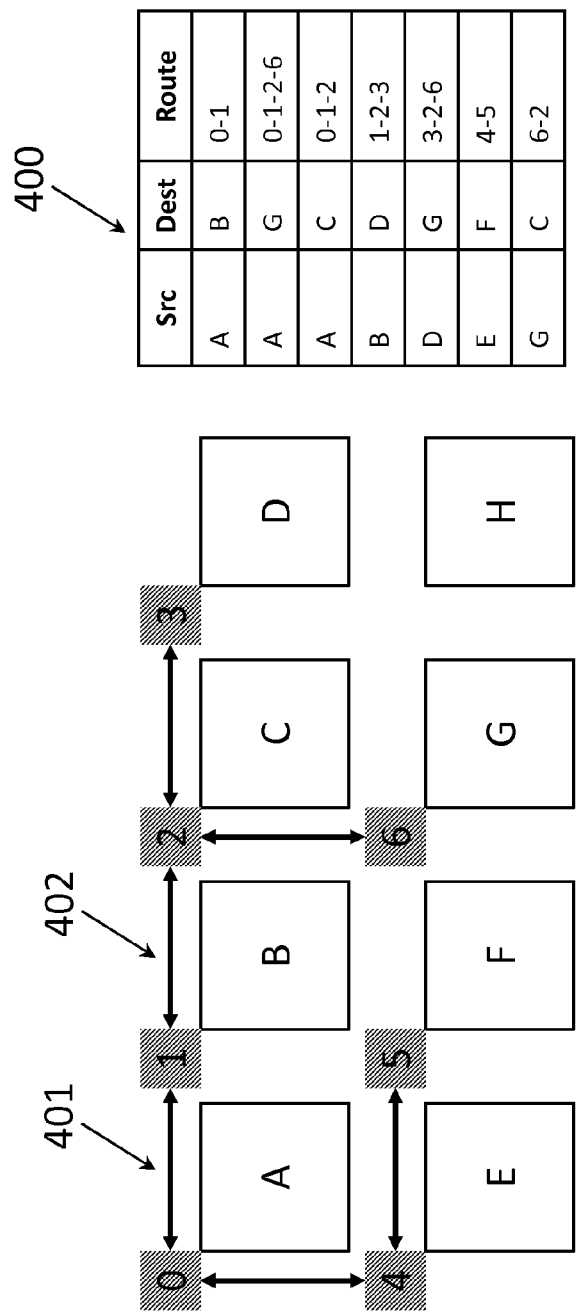
FIG. 4(b) illustrates a 4×2 mesh NoC mapping three traffic profiles using routing as indicated by the routing table.

Alternative example implementations may not use XY route for all transactions, and as a result may allocate different sets of links and router nodes while designing the NoC to support the transactions of the traffic profiles. In FIG. 4(b), different sets of routes are being used to support the transaction of the three traffic profiles as shown in the table 400. As a result the router node 7 and the links between routers 1 and 5 and routers 5 and 6 are not needed in the NoC. In this NoC, based on the set of routes for various transactions of the three traffic profiles, certain NoC links experience more load than the others. For example, NoC link 401 between routers 0 and 1, and link 402 between routers 1 and 2, have three transactions mapped to them. The uneven load on various NoC channels may affect the NoC performance. To address the uneven load, additional NoC layers may need to be allocated to provide additional bandwidth at certain regions of the NoC topology. Alternatively, the traffic routes may be chosen in a more balanced manner. When NoC is designed to support various traffic profiles, routes may be determined and virtual channel and NoC layer may be allocated in a coordinated manner to balance the loads on NoC links. Nevertheless, overprovisioning of NoC links, virtual channels, and layers may still occur because multiple traffic profiles are all mapped simultaneously without the knowledge of which traffic profiles may or may not co-exist in a running system.

If the information on which traffic profiles may co-exist with each other and which may not is available, then a number of optimizations may be performed during the NoC design process. For example, if traffic profile 1 and profile 2 may not co-exist in the SoC, then the load on channels 401 and 402 may not become excessive with the set of routes shown in FIG. 4(b) and therefore these routes and the resulting NoC design may be acceptable. The traffic co-existence data may be used in a number of ways to avoid NoC bandwidth over-provisioning. For any two traffic profiles which may not co-exist simultaneously in a system, when their transactions are mapped, they are attempted to be placed over the same set of routes, links and layers. If two transactions have common source or destination nodes and comparable QoS requirements, then there is an opportunity for sharing NoC hardware resources. For example, if transaction t1 of profile 1 and t2 of profile 2 have at least a common source node or common destination node, comparable QoS requirements, but they cannot co-exist, then they may be mapped to the same NoC layer and route. Since the two transactions cannot co-exist, the bandwidth provisioned at the route is max(bw(t1), bw(t2)), where bw(t) is the bandwidth requirement of a transaction, thus avoiding the overprovisioning of NoC channels.

Another example implementation may compute the overall bandwidth requirements of all simultaneously co-existing traffic profiles, and allocate the NoC layers and bandwidth accordingly.

The virtual channel allocation may also benefit from the information of co-existence of traffic profiles. For example if transactions t1 and t2 in the previous example have different priority requirements, meaning they need different virtual channels to for them, then a naïve design may use two virtual channels along the common route of the transactions. However with the knowledge that these two transactions may never appear simultaneously, a single virtual channel along the common routes of t1 and t2 may be sufficient. When transaction t1 is present the virtual channels along the route of t1 may be reconfigured to the priority level of t1, else the virtual channel may be configured to the priority level of t2. In an example implementation, as traffic profiles are being mapped to the existing or newly allocated virtual channels, the virtual channels are marked with what traffic transactions uses the channels and their QoS and deadlock avoidance information. When a new traffic profile is being mapped, an existing virtual channel previously allocated for previously mapped traffic profiles may be reused even if the QoS or deadlock properties of the new traffic profile is different from the previous ones as long as the previous traffic profiles mapped to the virtual channel cannot co-exist with the new profile.

Figure 5:
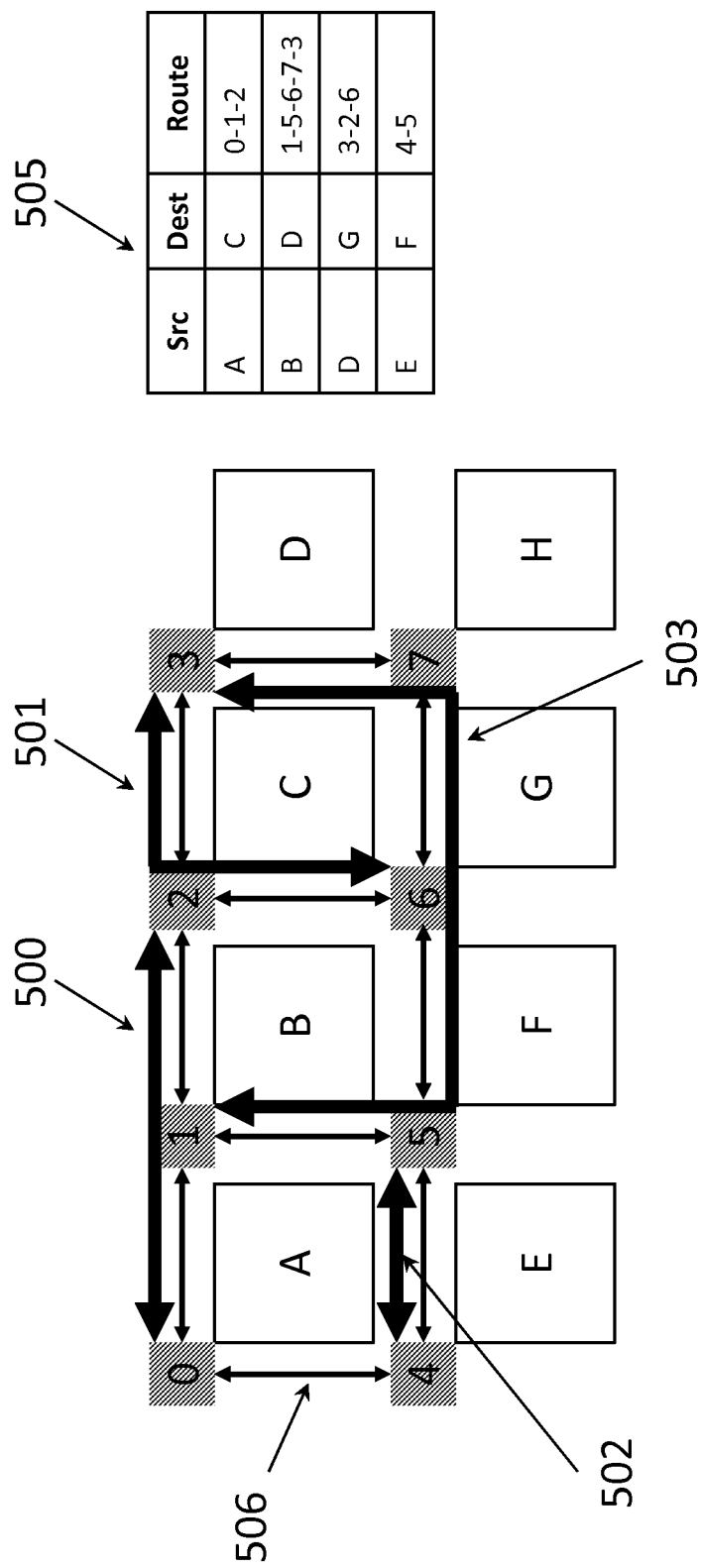
FIG. 5 illustrates a 4×2 mesh NoC mapping a single traffic profile using routing as indicated by the routing table.

After the NoC is designed, and the NoC layers, links, and virtual channels are allocated to support any combination of co-existing traffic profiles of the system, certain reconfigurability may be useful for further performance optimizations. Consider the example in FIG. 4(a). Here, NoC channels are allocated with the assumption that XY route is used. Assuming that traffic profile 2 may not co-exist with other traffic profiles, when the system is configured for traffic profile 2, the routes may be reconfigured to provide better load balancing of the NoC channels. Assuming that all transactions of traffic profile require equal bandwidth and that all NoC links have equal available bandwidth, load balanced routes for the transactions of traffic profile 2 listed above, is shown in FIG. 5. In the resulting routing table 505, all routes are the shortest path except route 503, for the transaction between host B at node 1 and host D at node 3. The shortest path route for this transaction is 1-2-3, however this will increase the load on channels 500 and 501 both of which already have a transaction mapped to them. All links along route 503 is unused after mapping the other transactions using the routes as indicated by the diagram, therefore using route 503 for this transaction will keep the load on all NoC channels at a single transaction. With this set of routes, the link 506 does not carry any traffic and can be set to inactive state for lower power or even powered down. To readjust the NoC routes for transactions of traffic profile 2, and set certain unused links and routers to inactive states, the NoC hardware needs to support certain level of reconfigurability.

An example NoC hardware implementation may support any combination of the following reconfigurable elements. The routing table and virtual channel and NoC layer mapping tables may be designed such that they can be re-configured. A routing table may be used to map the transaction between a source and destination node to a route in the NoC. A virtual channel and NoC layer mapping table contains mapping information of transactions between all source and destination nodes to the NoC layers and VCs used for the transactions. A sub-instance of the global routing and virtual and NoC layer mapping information may be configured at every source node on the NoC. The instance may contain the route, the VC and the NoC layer of all transactions originating from the source node to all destination nodes with which it communicates with. In addition to allowing re-configurable routing, VC and NoC layer mapping tables, QoS attributes such as priority level, bandwidth allocation, arbitration weight assigned to various NoC links and virtual channels may be designed to be reconfigurable. An example implementation may also include re-configurable elements in the NoC hardware that allows certain router nodes and links between two router nodes to be set to inactive state for lower power dissipation, or even powered down altogether based on the traffic mapping.

Once re-configurability of certain elements is supported by the NoC hardware, an external optimization module may be used for configuring the NoC hardware to achieve better performance and power efficiency based on the traffic profile currently in-use in the SoC. An example implementation is shown in FIG. 6. The external module, named the NoC reconfiguration module, analyzes the current NoC traffic profile based on the SoC applications and maps the traffic transactions to the NoC in order to improve the system performance. During the mapping, the routes for various transactions, and the NoC layer and VC for them are determined. The arbitration policies at the routers, priorities of the virtual channels, and QoS properties may also be computed. The routers and links that do not have any traffic assigned to them may be marked as well, as they can be moved into low power inactive states. Subsequently, these results are used to generate the NoC re-configuration data, which may be loaded to the NoC hardware in order to reconfigure the NoC and deploy the mapping.

Figure 7:
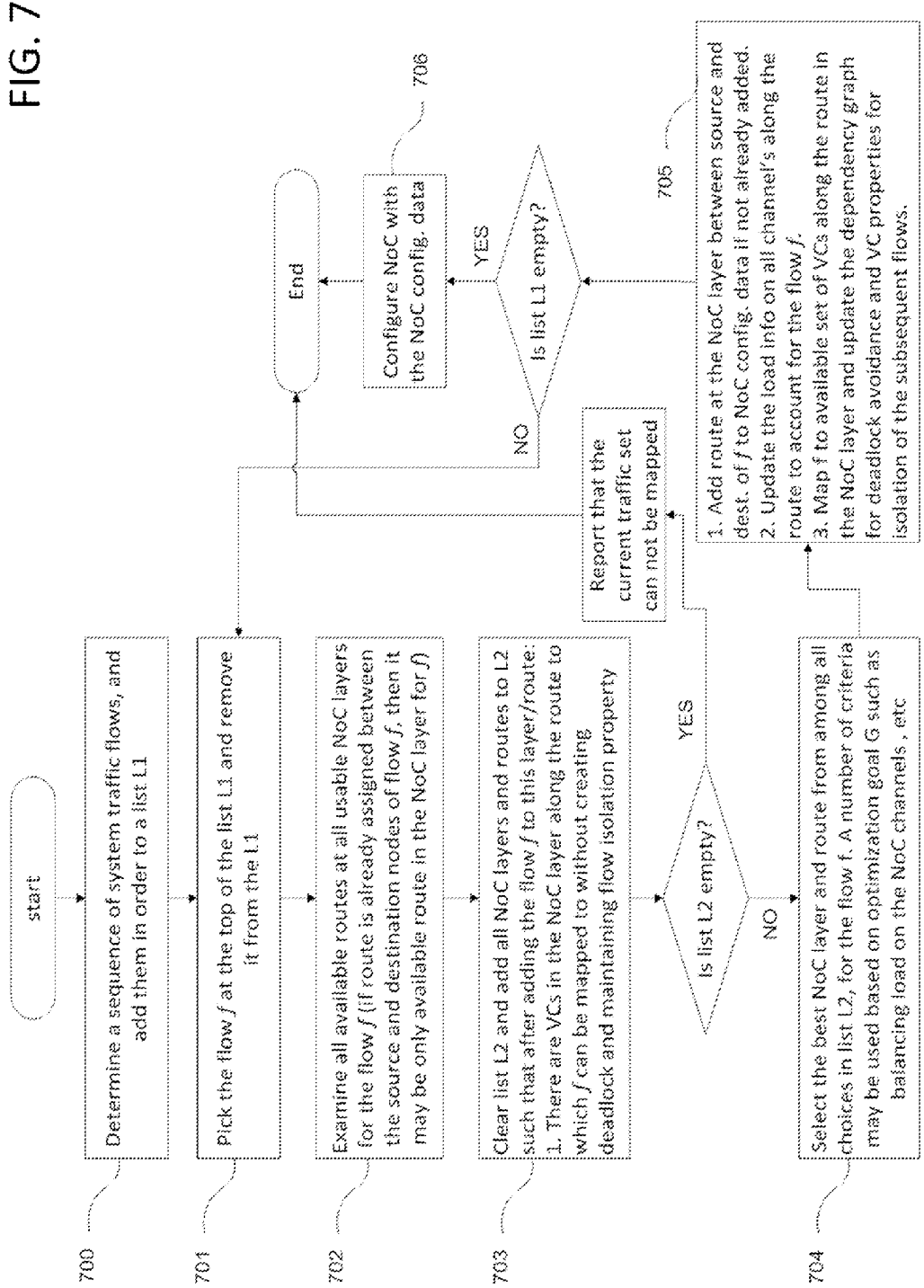
FIG. 7 illustrates a flowchart of an example implementation of the traffic mapping to NoC hardware by the external reconfiguration module.

FIG. 7 describes an example implementation of the determining the routes, NoC layer and VCs for various transactions of a traffic profile and using this to reconfigure the NoC hardware. The system starts with the available NoC hardware resources and begins mapping traffic transactions onto them. The transactions of the subset of traffic profiles present in the system are mapped to the NoC one by one in sequence as shown at 700. The transactions are put into an ordered list L1 according to the sequence. A number of sequences may be used, such as higher bandwidth transactions first or lower latency transactions first. Transactions with common source and common destination may be processed consecutively. Different sequences may provide different results, and an example implementation may try a number of sequences and then use the one that gives the desired results depending on the desired implementation.

At 702 and 703, for every transaction currently being processed, all valid routes at all NoC layers are examined. All valid routes and NoC layers where some virtual channels are available for mapping the transaction without creating a deadlock and maintaining isolation, QoS and priority properties can be used for this transaction and are added to a list L2. In some designs the load on the links along the route may be examined as well to determine if mapping the transaction to the route will overload certain links along the route or not; only those routes that are not overloaded are added to the list L2. Subsequently, at 704, a NoC layer and route is chosen from among all choices in the list L2. This selection may be performed to minimize the load on all NoC channels or to reduce the number of virtual channels usage. In the former case, one may select a route that has the lowest cumulative load on all channels along the route, or one may pick the route that has the lowest peak load across all channels of the route. Such schemes will attempt to keep the load on all channels uniform. In the latter case, one may attempt to use routes where previously used virtual channels for previously mapped transactions may be reused for mapping this transaction, thus conserving the virtual channel usage. Certain example implementations may use combination of both, attempting to reduce the bandwidth of NoC links and reduce the virtual channel usage. At 705, the chosen route is configured in the chosen NoC layer if it is not already configured, and the channel loads and dependency graph for deadlock avoidance are updated. The details of the dependency graph construction and deadlock detection and avoidance with additional VCs are described in U.S. application Ser. Nos. 13/599,559 and 13/745,684. If no valid routes exist in list L2 then the mapping of the transaction fails. Finally, at 706, the configuration data is used to re-configure the NoC.

In addition to configuring the routes, virtual channels and NoC layers for various transactions, a number of additional configuration parameters may be determined as well during mapping of the transactions. VC properties such as priority and QoS parameters, arbitration policies at various links and routers, whether certain VCs and links have any transaction mapped to them or not, etc., can be determined and the NoC can be re-configured accordingly. These parameters may be tracked and updated as well in step 705 as transactions are being mapped, and collected data may be used as a feedback in step 704 as well to better map the new transactions.

The configuration parameters collected during the traffic mapping may be organized in a number of ways in the external optimization module based on the level of sophistication of the desired implementation and the capabilities of the NoC reconfigurable hardware. Some examples are shown in FIG. 8. The routing table may be organized in the four ways as shown in the diagram. Here the routing information is organized as n-dimensional vector which is shown as {k1, k2, kn, result}; The first set of n elements are the n indices of the vector, one for each dimension, and the last element is the result stored in the vector which is the routing info in this case. In the routing table type of 800, for every pair of source and destination nodes, a single route is used; thus 2D vector is adequate for maintaining the routing information with source node as first index, and destination node as the second. This is useful in the cases in which the NoC hardware supports one route for all transactions between a pair of source and destination nodes in the NoC. If NoC hardware allows different routes in different NoC layers then a 3D vector shown in the routing table type of 801 may be used to store the routing info in each NoC layer as they are being computed. A more sophisticated NoC hardware implementation may allow different routes to be used for different virtual channels within the NoC layer, in which case the routing table type of 802 may be used to organize the route information. Finally, if the NoC hardware allows different routes for different transactions between the same source and destination nodes, virtual channels and NoC layers, then the routing table type of 803 may be used.

The next set of data-structures can be used to store information for further optimization of the routers, links and virtual channels and possibly powering them down or putting them into inactive states based on whether traffic transactions are mapped to them or not. If NoC hardware only allows an entire router to be powered down or set to an inactive state then the router optimization configuration of 804 may be used. In the configuration of 804, for every router in every NoC layer, an active or inactive flag is maintained. If no transaction is mapped to a router then the router can be set as inactive, else it stays active. If the NoC hardware allows individual router links to be powered down or set to an inactive state, then the configuration of 805 may be used to individually track whether the links of various routers in various NoC layers are active or not. If the NoC hardware allows certain arbitration elements within routers to be configured to an inactive state for better power or timing efficiency, then this information may be tracked in configurations 806 or 807. In the configuration of 806, the information on which source port of the router contends for which destination ports is maintained, and the configuration of 807 maintains even finer grained information on which source port's virtual channel's contends for which destination port's virtual channels.

The next set of reconfigurable information in FIG. 8 is related to the QoS, such as priority values, weights assigned to certain channels (see, for example, U.S. application Ser. No. 13/745,696, herein incorporated by reference for all purposes in its entirety), inter barrier period for distributed QoS (see, for example, U.S. application Ser. No. 13/723,882, herein incorporated by reference for all purposes in its entirety), and maximum transmission rates. If the router hardware supports priority assignment for different virtual channels, then data structure 808 may be used to maintain this information in the external optimization module. If the router hardware supports weight assignment to various virtual channels or barrier based fairness enforcement then data structures 809 and 810 may be used to maintain these information as they are computed by the external optimization module. Finally, if the NoC hardware supports limiting the transmission rates at certain virtual channels of certain links of certain routers then this info can be maintained in data structure 811. Once all NoC configuration information is collected in these data structures in the external optimization module, they can be used to re-configure the NoC hardware.

Figure 9:
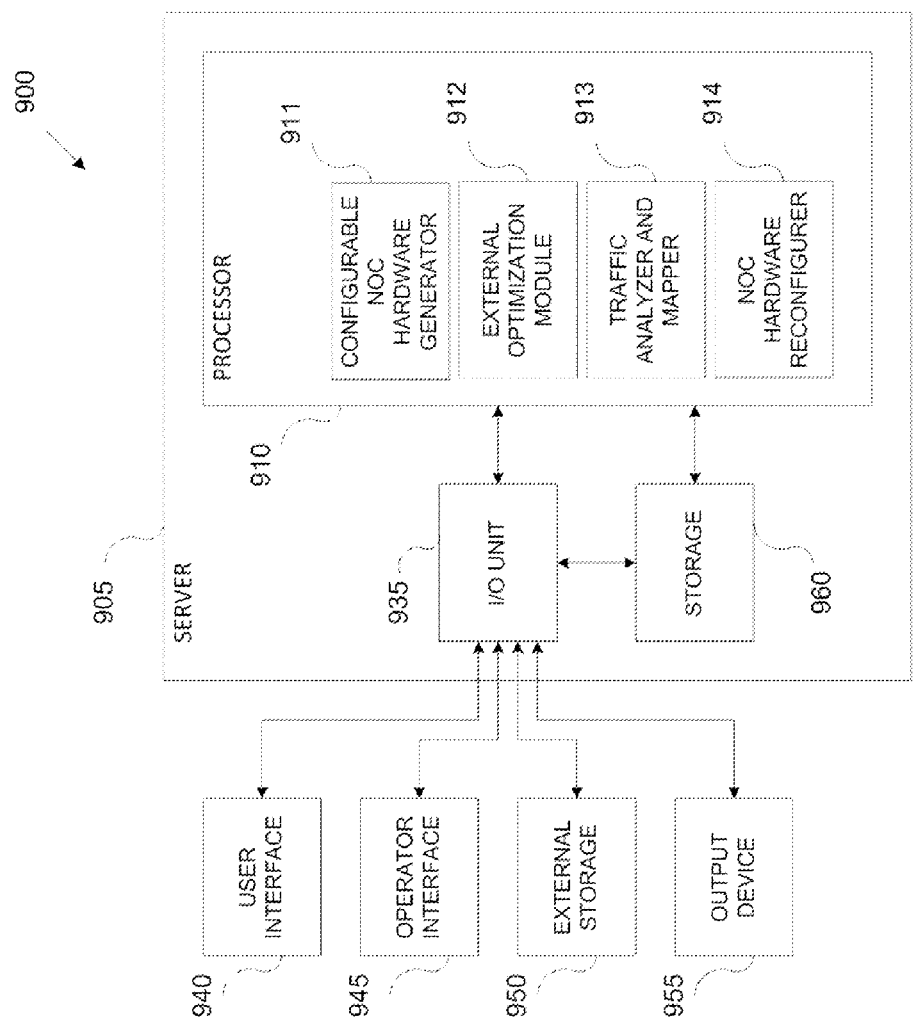
FIG. 9 illustrates a computer/server block diagram upon which the example implementations described herein may be implemented.

FIG. 9 illustrates an example computer system 900 on which example implementations may be implemented. The computer system 900 includes a server 905 which may involve an I/O unit 935, storage 960, and a processor 910 operable to execute one or more units as known to one of skill in the art. The term "computer-readable medium" as used herein refers to any medium that participates in providing instructions to processor 910 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 940 and operator interfaces 945 which may utilize input devices such as a keyboard, mouse, touch device, or verbal command.

The server 905 may also be connected to an external storage 950, which can contain removable storage such as a portable hard drive, optical media (CD or DVD), disk media or any other medium from which a computer can read executable code. The server may also be connected an output device 955, such as a display to output data and other information to a user, as well as request additional information from a user. The connections from the server 905 to the user interface 940, the operator interface 945, the external storage 950, and the output device 955 may via wireless protocols, such as the 802.11 standards, Bluetooth® or cellular protocols, or via physical transmission media, such as cables or fiber optics. The output device 955 may therefore further act as an input device for interacting with a user.

The processor 910 may execute one or more modules. The configurable NoC hardware generator module 911 may be configured to analyze all system traffic profiles supported in a SoC and the information on which ones may co-exist and then generate a NoC hardware that can support these traffic profiles. The generated NoC hardware may support reconfigurable elements for performance optimizations later. The external optimization module 912 may analyze the traffic profiles presently in use in the SoC, and based on it, map the traffic transaction to the NoC hardware and determine the NoC reconfiguration information. The traffic analyzer and mapper module 913 can be used for analyzing multiple traffic profiles and mapping them to the NoC hardware. This module can be used by both configurable NoC hardware generator module and external optimization module. NoC hardware reconfigurer module 914 may be configured to collect the re-configuration data as they are being computed by the external optimization module, reformat this data into a format than can be loaded into the re-configurable NoC hardware, and transmit the data to reconfigure the NoC hardware reconfigurable elements to perform the reconfiguration.

Figure 10:
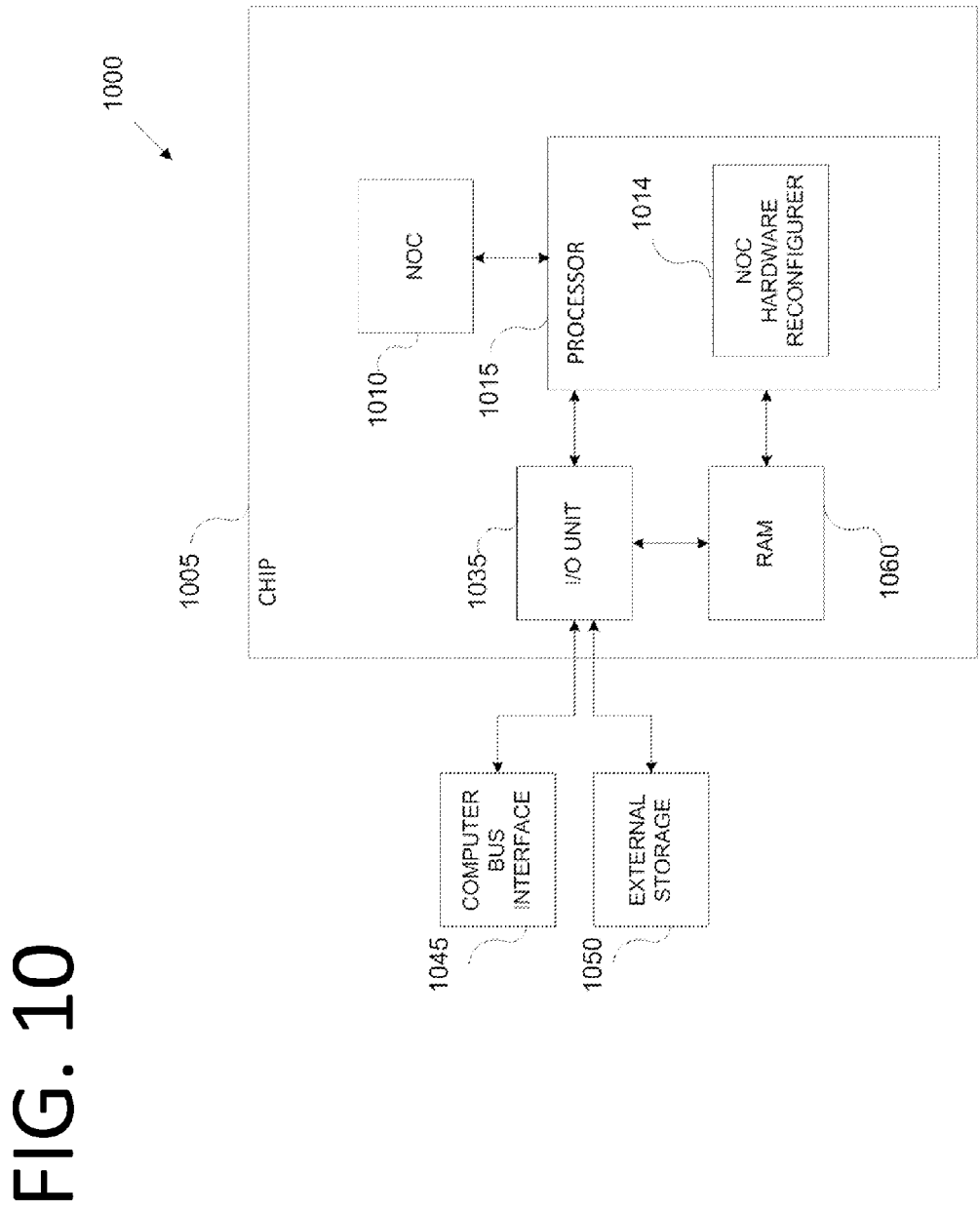
FIG. 10 illustrates an example Network on Chip (NoC) block diagram, on which example implementations may be implemented.

FIG. 10 illustrates an example Network on Chip (NoC) hardware block diagram 1000, on which example implementations may be implemented. The NoC 1010 may include a plurality of routers and hosts that are connected by interconnects, as illustrated and described in FIGS. 1-6. The NoC 1010 can be implemented on a chip 1015, which may be in the form of an integrated circuit, such as a System on Chip (SoC), Very-Large-Scale-Integration (VLSI) device or other hardware configurations, depending on the desired implementation. In an example configuration, the NoC 1010 is configured to handle all allowed subsets of the plurality of system traffic profiles supported in a System on Chip (SoC), and may be reconfigured to support any subset of the system traffic profiles as desired.

Chip 1015 may also include an I/O unit 1035 for facilitating communications between the chip 1015 and a computer system implementing the chip 1015 via a computer bus interface 1045 and external storage 1050. Chip 1015 may also include Random Access Memory (RAM) 1060 and processor 1015. Processor 1015 may store and execute a NoC hardware reconfigurer module 1014 to reconfigure the NoC 1010 based on received mapping information. The reconfiguration may involve reconfiguring the active traffic profile of the NoC 1010 from supporting a first subset of system traffic profiles of the chip 1015 to supporting a second subset of system traffic profiles of the chip 1015. The reconfiguration may involve instructing one or more routers of the NoC 1010 to reconfigure the routes of the NoC 1010, to power up or down one or more hosts of the NoC 1010, and/or to render one or more hosts of the NoC 1010 to be active/inactive, based on the mapping information. In another example configuration, the NoC hardware reconfigurer module 1014 can be stored in the routers of the NoC 1010, and utilize processor 1015 for executing the NoC hardware reconfigurer module 1014.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method, comprising:
for a plurality of system traffic profiles supported in a system on chip (SoC), wherein each of the plurality of system traffic profiles comprise a set of traffic flows, determining a Network on Chip (NoC) hardware configuration that supports at least a first subset and a second subset of the plurality of system traffic profiles and that is further configurable to change an active traffic profile of the NoC hardware configuration from the first subset to the second subset and change the first subset to be inactive.

2. The method of claim 1, further comprising:
while the NoC hardware configuration is deployed in the SoC, reconfiguring the active traffic profile of the NoC hardware configuration from the first subset to the second subset.

3. The method of claim 2, wherein the reconfiguring the active traffic profile of the NoC hardware configuration comprises receiving mapping information for one or more traffic profiles of the plurality of the system traffic profiles and transmitting the mapping information to a NoC deployed in the SoC.

4. The method of claim 3, wherein the mapping information comprises transaction assignments of the one or more traffic profiles to each NoC layer in the NoC hardware configuration and route assignments for each NoC layer in the NoC hardware configuration.

5. The method of claim 1, wherein the determining the NoC hardware configuration further comprises:
determining all allowed subsets of the plurality of system traffic profiles; and
determining a NoC configuration that is configured to support the determined all allowed subsets, the NoC configuration comprising:
one or more physical channels,
one or more virtual channels;
one or more NoC layers;
Quality of Service (QoS) parameters for each of the one or more physical channels and the one or more virtual channels; and
weights for each of the one or more physical channels and the one or more virtual channels.

6. A non-transitory computer readable storage medium storing instructions for executing a process, the instructions comprising:
for a plurality of system traffic profiles supported in a system on chip (SoC), wherein each of the plurality of system traffic profiles comprise a set of traffic flows, determining a Network on Chip (NoC) hardware configuration that supports at least a first subset and a second subset of the plurality of system traffic profiles and that is further configurable to change an active traffic profile of the NoC hardware configuration from the first subset to the second subset and change the first subset to be inactive.

7. The non-transitory computer readable storage medium of claim 6, wherein the instructions further comprise:
while the NoC hardware configuration is deployed in the SoC, reconfiguring the active traffic profile of the NoC hardware configuration from the first subset to the second subset.

8. The non-transitory computer readable storage medium of claim 7, wherein the reconfiguring the active traffic profile of the NoC hardware configuration comprises receiving mapping information for one or more traffic profiles of the plurality of the system traffic profiles and transmitting the mapping information to a NoC deployed in the SoC.

9. The non-transitory computer readable storage medium of claim 8, wherein the mapping information comprises transaction assignments of the one or more traffic profiles to each NoC layer in the NoC hardware configuration and route assignments for each NoC layer in the NoC hardware configuration.

10. The non-transitory computer readable storage medium of claim 6, wherein the determining the NoC hardware configuration further comprises:
   determining all allowed subsets of the plurality of system traffic profiles; and
   determining a NoC configuration that is configured to support the determined all allowed subsets, the NoC configuration comprising:
      one or more physical channels;
      one or more virtual channels;
      one or more NoC layers;
      Quality of Service (QoS) parameters for each of the one or more physical channels and the one or more virtual channels; and
      weights for each of the one or more physical channels and the one or more virtual channels.

11. A system, comprising:
   a configurable Network on Chip (NoC) hardware generator module configured to:
   for a plurality of system traffic profiles supported in a system on chip (SoC), wherein each of the plurality of system traffic profiles comprise a set of traffic flows, determine a Network on Chip (NoC) hardware configuration that supports at least a first subset and a second subset of the plurality of system traffic profiles and that is further configurable to change an active traffic profile of the NoC hardware configuration from the first subset to the second subset and change the first subset to be inactive.

12. The system of claim 11, further comprising a Network on Chip (NoC) hardware reconfigurer module configured to:
   while the NoC hardware configuration is deployed in the SoC, reconfigure the active traffic profile of the NoC hardware configuration from the first subset to the second subset.

13. The system of claim 12, further comprising an external optimization module configured to determine mapping information for one or more traffic profiles of the plurality of the system traffic profiles for reconfiguration of the active traffic profile of the NoC hardware configuration.

14. The system of claim 13, further comprising a traffic analyzer and mapper module configured to analyze transaction assignments of the one or more traffic profiles to each NoC layer in the NoC hardware configuration and route assignments for each NoC layer in the NoC hardware configuration to determine mapping information for the NoC hardware configuration.

15. The system of claim 11, wherein the configurable Network on Chip (NoC) hardware generator module is further configured to:
   determine all allowed subsets of the plurality of system traffic profiles; and
   determine a NoC configuration that is configured to support the determined all allowed subsets, the NoC configuration comprising:
      one or more physical channels;
      one or more virtual channels;
      one or more NoC layers;
      Quality of Service (QoS) parameters for each of the one or more physical channels and the one or more virtual channels; and
      weights for each of the one or more physical channels and the one or more virtual channels.

16. An integrated circuit (IC), comprising:
   a Network on Chip (NoC) comprising a plurality of hosts interconnected with a plurality of channels by a plurality of routers; and
   a NoC reconfigurer module configured to change an active traffic profile of the NoC from a first subset of a plurality of system traffic profiles to a second subset of the plurality of system traffic profiles and change the first subset to be inactive.

17. The IC of claim 16, wherein the NoC reconfigurer module is further configured to receive mapping information and, based on the received mapping information, perform at least one of:
   power up or down at least one of:
      one or more of the plurality of hosts, one or more of the plurality of routers, and one or more of the plurality of channels; and
   set, as active or inactive, at least one of:
      one or more of the plurality of hosts, one or more of the plurality of routers, and one or more of the plurality of channels.

18. The IC of claim 17, wherein the mapping information comprises transaction assignments of one or more traffic profiles to each NoC layer in the NoC and route assignments for each NoC layer in the NoC.

19. The IC of claim 17, wherein the NoC reconfigurer module is further configured to reconfigure one or more of the plurality of routers and one or more bridges to facilitate routes based on the received mapping information.

20. The IC of claim 17, wherein the NoC is configured to handle all allowed subsets supported in a System on Chip (SoC) of the plurality of system traffic profiles.

* * * * *